(No Model.) 2 Sheets—Sheet 1.
F. C. WILSON.
APPARATUS FOR LEACHING COFFEE.
No. 394,046. Patented Dec. 4, 1888.
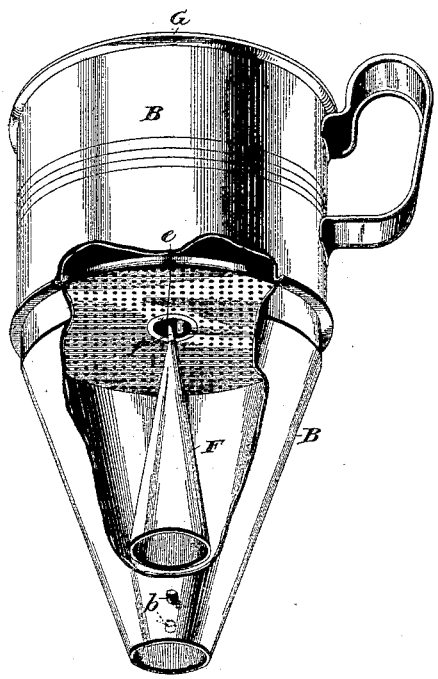
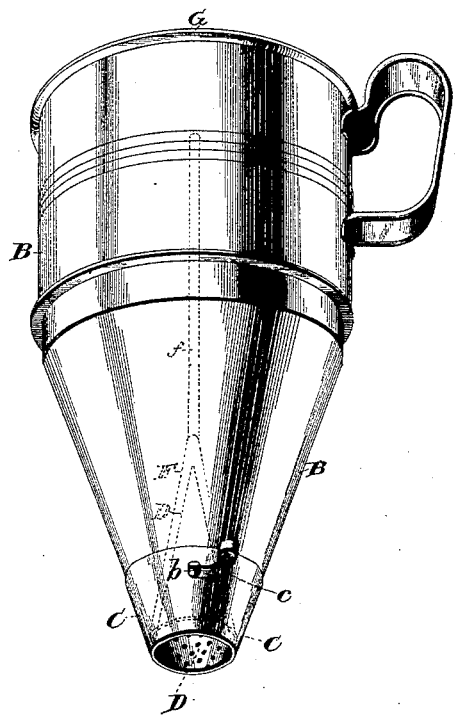
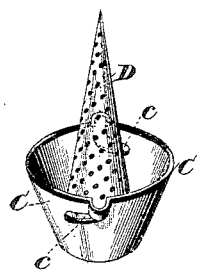
Witnesses:
Chas. J. Williamson
Henry C. Hazard
Inventor:
F. C. Wilson, by
Pindle and Russell, his Attys.

(No Model.)  2 Sheets—Sheet 2.

F. C. WILSON.
APPARATUS FOR LEACHING COFFEE.

No. 394,046.  Patented Dec. 4, 1888.

Witnesses:
Chas. J. Williamson
Henry C. Hazard

Inventor:
F. C. Wilson, by
Crindle and Russell, his Attys.

UNITED STATES PATENT OFFICE.

F. CORTEZ WILSON, OF CHICAGO, ILLINOIS.

APPARATUS FOR LEACHING COFFEE.

SPECIFICATION forming part of Letters Patent No. 394,046, dated December 4, 1888.

Application filed January 9, 1888. Serial No. 260,118. (No model.)

*To all whom it may concern:*

Be it known that I, F. CORTEZ WILSON, of Chicago, in the county of Cook, and in the State of Illinois, have invented certain new and useful Improvements in Apparatus for Leaching Coffee; and I do hereby declare that the following is a full, clear, and exact description thereof, reference being had to the accompanying drawings, in which—

Figure 3:
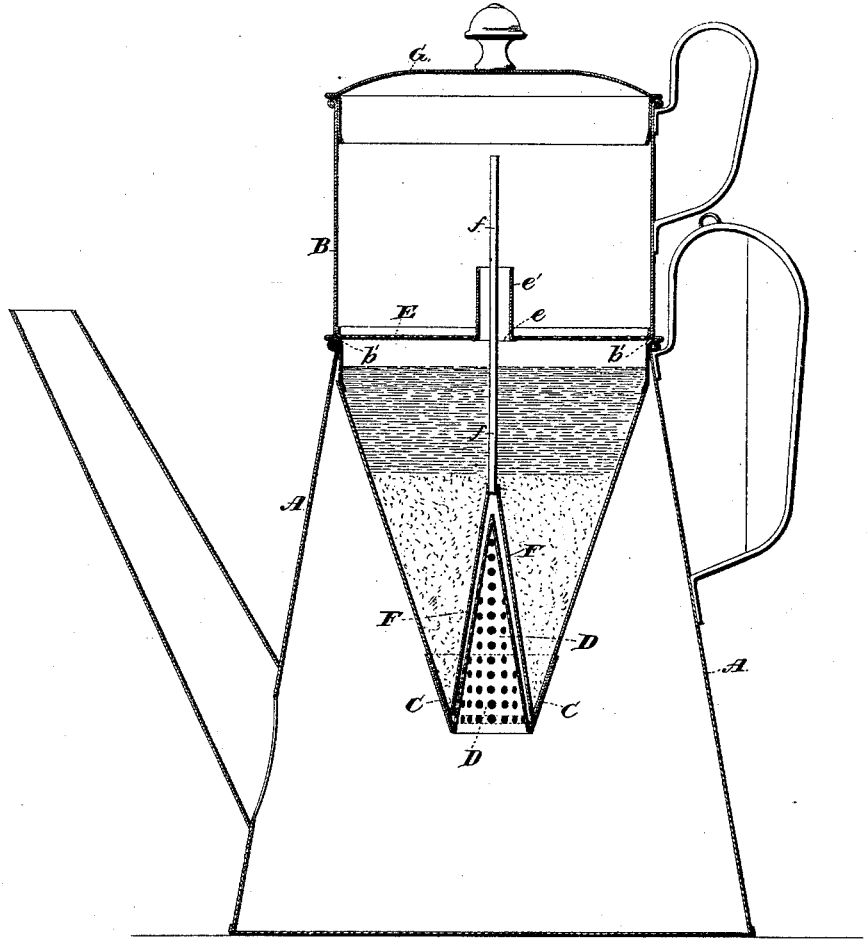
Figure 4:
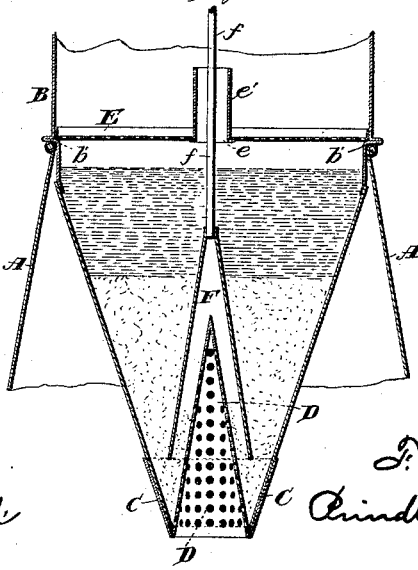

Figure 1 is a perspective view of the operative parts of my apparatus separated from each other and from the body of the coffee-pot. Fig. 2 is a like view of the same when combined. Fig. 3 is a vertical central section of the apparatus complete and ready for operation, and Fig. 4 is a like view of the same with the strainer-hood raised to permit of the downward passage of water through the coffee.

Letters of like name and kind refer to like parts in each of the figures.

The object of my invention is to insure a control of the passage of water through coffee in a leaching or drip apparatus; and to this end my said invention consists in the means employed and the construction and combination of parts, substantially as and for the purpose hereinafter specified.

In the application of my invention to use I employ a coffee-pot, A, of any usual form or construction, and within the upper open end of the same fit a cup, B, that above said top has the form of a plain cylinder, while within said coffee-pot said cup has a downwardly-decreasing shape and at its lower open end has a diameter of about one inch.

Fitted over and conforming to the lower end of the cup or percolator B is a sleeve, C, that is adapted to be secured thereon by means of two lugs, $b$ and $b$, which project radially outward from opposite sides of said percolator and engage with curved slots $c$ and $c$, that are formed in the sleeve, the construction being commonly known as a "bayonet-lock." Said sleeve has secured to and within its lower end the lower largest end of a reticulated sheet-metal cone, D, which closely fills said end, and from thence projects upward into the percolator and is adapted to act as a strainer for the same.

At a suitable point near or at the lower end of the cylindrical portion of the percolator B is provided an inwardly-projecting ledge, $b'$, upon which is placed a perforated or reticulated sheet-metal diaphragm, E, that is provided with a central opening, $e$, around which is secured a tube, $e'$, that from thence extends upward about one inch, which diaphragm is intended to prevent coffee contained within the space beneath from floating upward when water is poured into said percolator.

Fitted loosely over the strainer D is a conical cap or hood, F, which is made from imperforate sheet metal, and when at its lowest point, as seen in Fig. 3, operates to substantially close the lower end of the percolator B and prevent the downward passage of water, but when raised from such position affords an exit for the water, which corresponds in size and capacity to the amount of elevation given said hood. A rod, $f$, secured within or to the upper end of the latter, and from thence extending upward through the tube $e'$, furnishes a means whereby said hood may be raised or lowered.

A cover, G, which is adapted to inclose the upper end of the percolator B or the upper end of the coffee-pot A, completes the apparatus, the use and operation of which are as follows, viz: The parts, with exception of the cover and diaphragm, being in position, as shown in Fig. 3, the desired quantity of ground coffee is placed in the percolator, the diaphragm is replaced, and the necessary quantity of boiling water is then poured into the same. After a sufficient time has elapsed to enable the coffee to become thoroughly saturated the hood is raised and the water permitted to pass downward into the coffee-pot. The distance to which said hood should be raised depends upon the quantity of coffee used, from one-sixteenth to one-eighth of an inch being sufficient when but one or two cups of coffee are to be made, while, if the percolator is nearly filled with coffee, said hood may be raised so as to substantially uncover the whole of the strainer. When the hood is raised, the coffee will settle into the space beneath its lower end and operate to hold it in raised position.

While the conical form of hood and strainer are preferably used, it will be seen that if made in the form of plain cylinders with closed upper ends the parts will, to a certain extent, perform the same office.

It will also be seen that the operation of the strainer will be the same whether permanently or temporarily secured within or over the outlet of the percolator, the construction shown being intended to facilitate the cleaning of the apparatus.

Having thus described my invention, what I claim is—

1. As an improvement in apparatus for leaching coffee, a percolator which has its lower end inclosed by a strainer, in combination with an imperforate hood that is adapted to be placed over or raised from off said strainer, substantially as and for the purpose shown.

2. As an improvement in apparatus for leaching coffee, the combination of a percolator which has a downwardly-decreasing diameter and is provided at its lower end with an outlet, a conical strainer that has its largest end placed within and caused to substantially fill such outlet, and an imperforate hood which is adapted to be closed down over or raised from off said strainer, substantially as and for the purpose set forth.

3. As an improvement in apparatus for leaching coffee, the combination of a receiving-vessel, a percolator secured within the upper end of such vessel and provided at its lower end with an outlet, a conical strainer having its largest end placed within such outlet and from thence extending upward within said percolator, and an imperforate hood which is adapted to be closed down over or raised from off said strainer, substantially as and for the purpose shown and described.

4. As an improvement in apparatus for leaching coffee, the combination of a receiving-vessel, a percolator secured within the upper end of such vessel and provided at its lower end with an outlet, a conical strainer having its largest end placed within such outlet and from thence extending upward within said percolator, an imperforate hood which is adapted to be closed down over or raised from off said strainer, and a perforated or reticulated diaphragm arranged horizontally within the upper portion of said percolator, substantially as and for the purpose specified.

In testimony that I claim the foregoing I have hereunto set my hand this 10th day of December, A. D. 1887.

F. CORTEZ WILSON.

Witnesses:
  CHAS. P. RANDALL,
  GEO. LANDIS WILSON.